(12) United States Patent
Matsuda

(10) Patent No.: US 7,458,915 B2
(45) Date of Patent: Dec. 2, 2008

(54) LEISURE VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 284 days.

(21) Appl. No.: 11/396,346

(22) Filed: Mar. 31, 2006

(65) Prior Publication Data

US 2006/0241843 A1    Oct. 26, 2006

(30) Foreign Application Priority Data

Apr. 5, 2005  (JP)  ............................. 2005-108935
Jan. 25, 2006  (JP)  ............................. 2006-016143

(51) Int. Cl.
*B60W 10/04*  (2006.01)

(52) U.S. Cl. ..................................................... 477/107

(58) Field of Classification Search .................. 701/85; 477/107

See application file for complete search history.

(56) References Cited

U.S. PATENT DOCUMENTS

2006/0272875 A1* 12/2006 Matsuda ...................... 180/197

FOREIGN PATENT DOCUMENTS

JP         10-159594        6/1998

* cited by examiner

*Primary Examiner*—Dirk Wright
(74) *Attorney, Agent, or Firm*—Alleman Hall McCoy Russell & Tuttle LLP

(57) ABSTRACT

A leisure vehicle equipped with an internal combustion engine as a power unit to drive the leisure vehicle, including a drive wheel, a slip sensor unit configured to detect a slip of the drive wheel, a throttle device mounted to the internal combustion engine, a throttle valve position changing device configured to change a position of a throttle valve of the throttle device, a throttle close operation sensor unit configured to detect that a rider has performed a throttle close operation to close a throttle of the throttle device, and a controller configured to control an operation of the throttle valve position changing device.

11 Claims, 12 Drawing Sheets

LEISURE VEHICLE

TECHNICAL FIELD

The present invention generally relates to a leisure vehicle such as a motorcycle or an all terrain vehicle (ATV) in which, for example, a four-cycle internal combustion engine is mounted as a power unit configured to drive the leisure vehicle. More particularly, the present invention relates to a leisure vehicle configured to optimally control engine braking.

BACKGROUND ART

When a rider performs an operation to close a throttle of an engine while traveling in a leisure vehicle, for example, a motorcycle, in which a four-cycle engine is mounted as a power unit to drive the leisure vehicle, a negative drive force (braking torque) is generated in the engine to cause engine braking. As a result, the motorcycle decelerates.

The engine braking is able to assist a brake device to stop the motorcycle smoothly or to decelerate it at a suitable speed near a corner.

In these cases, to enable the engine braking to occur in a suitable condition, the rider selects a gear position for effecting the engine braking according to a travel speed, and operates a clutch lever slowly.

In order to enable the engine braking to occur optimally, it is required to effectively utilize an engine braking characteristic or the like of the motorcycle according to the travel speed. When a higher gear position is selected instead of an optimal gear position to effect the engine braking, desired deceleration or engine braking may be difficult to achieve, while when a lower gear position is selected, greater engine braking tends to occur.

In order to solve the above mentioned problem, Japanese Laid-Open Patent Application Publication No. Hei. 10-159594 discloses a motorcycle capable of achieving suitable engine braking.

SUMMARY OF THE INVENTION

The present invention addresses the above mentioned problem, and an object of the present invention is to provide a leisure vehicle that is capable of obtaining suitable engine braking.

According to one aspect of the present invention, there is provided a leisure vehicle equipped with an internal combustion engine as a power unit to drive the leisure vehicle, comprising a drive wheel; a slip sensor unit configured to detect a slip of the drive wheel; a throttle device mounted to the internal combustion engine; a throttle valve position changing device configured to change a position of a throttle valve of the throttle device; a throttle close operation sensor unit configured to detect that a rider has performed a throttle close operation to close the throttle valve of the throttle device; and a controller configured to control an operation of the throttle valve position changing device; wherein the controller is configured to cause the throttle valve position changing device to operate to change the position of the throttle valve to increase an engine speed of the engine for a moment, when the throttle close operation sensor unit detects that the rider has performed the throttle close operation and the slip sensor unit detects the slip of the drive wheel.

In accordance with the leisure vehicle constructed above, when the rider performs the throttle close operation to close the throttle valve, in order to, for example, decelerate a vehicle speed, the engine braking acts as follows. The throttle close operation sensor unit detects that the rider has performed the throttle close operation in order to effect the engine braking, and the slip sensor unit detects a slip state of the drive wheel. In response to this, the controller causes the throttle valve position changing device of the throttle device to operate to increase the engine speed. Thus, a braking force of the engine brake in a low engine speed range is made smaller than that obtained without the control. As a result, it is possible to generate engine braking that is less likely to cause the rear wheel to slip.

The throttle valve position changing device may be an idle stopper operation device configured to change a position of an idle stopper of the throttle valve of the throttle device.

The leisure vehicle may further comprise a non-drive wheel. The slip sensor unit may be configured to detect a state of the slip based on a ratio between a rotational speed of the non-drive wheel and a rotational speed of the drive wheel.

The internal combustion engine may be a four-cycle internal combustion engine.

The leisure vehicle may further comprise an engine speed sensor unit configured to detect an engine speed of the engine. The controller may be configured to cause the idle stopper operation device to operate to change the position of the idle stopper to open the throttle valve to a predetermined state, when the engine speed sensor unit detects a predetermined engine speed which is larger than an idling engine speed. Thereby, suitable engine braking according to an engine speed at that point of time is obtained.

The controller may be configured to change the position of the idle stopper to open the throttle valve to the predetermined state, according to the engine speed of the internal combustion engine.

The leisure vehicle may further comprise a throttle opening degree sensor unit configured to detect an opening degree of the throttle valve. The controller may be configured to cause the idle stopper operation device to operate to change the position of the idle stopper to open the throttle valve to a predetermined state, when the throttle opening degree sensor unit detects that the opening degree of the throttle valve is a predetermined degree which is larger than an idling position. Thereby, suitable engine braking according to an engine speed at that point of time is obtained.

The controller may be configured to change the position of the idle stopper to open the throttle valve to the predetermined state, according to the opening degree of the throttle valve.

The controller may be configured to cause the idle stopper operation device to operate to change the position of the idle stopper to open the throttle valve, thereby increasing the engine speed, and thereafter, may be configured to cause the idle stopper operation device to operate to change the position of the idle stopper to close the throttle valve at a speed slower than a speed obtained by the rider's operation to close the throttle valve, thereby obtaining an engine braking force that is smaller than an engine braking force obtained without control of the controller.

The leisure vehicle may further comprise a gear change sensor unit configured to detect a gear position change of a transmission. The controller may be configured to, for a moment, cause the idle stopper operation device to operate to change the position of the idle stopper to open the throttle valve to a predetermined state, when the gear change sensor unit detects shift down performed by the rider. With such a configuration, a downshift to select a lower gear position can be smoothly performed.

The throttle device may be configured to be operated by a fly-by-wire system. The throttle valve position changing device may be a throttle valve operation actuator configured to cause the throttle valve of the throttle device to open and close. Because the throttle valve operation actuator is able to be used as the throttle valve position changing device, the number of components does not increase.

According to another aspect of the present invention, there is provided a leisure vehicle equipped with an internal combustion engine as a power unit to drive the leisure vehicle, comprising a throttle device mounted to the internal combustion engine; a throttle valve position changing device configured to change a position of a throttle valve of the throttle device; a throttle opening degree sensor unit configured to detect an opening degree of the throttle valve; and a controller configured to control an operation of the throttle valve position changing device; wherein the controller is configured to change a closed position of the throttle valve from an idling position corresponding to an idling engine speed of the engine to an open position that is predetermined degrees open from the idling position, when the throttle opening degree sensor unit detects that the opening degree of the throttle valve is a predetermined degree which is larger than the idling position.

In accordance with the leisure vehicle constructed above, when the rider performs a throttle open operation to open the throttle valve to the predetermined degree or more, the controller causes the throttle valve position changing device to operate to change the closed position of the throttle valve from the idling position corresponding to the idling engine speed to the open position. Under this condition, when the rider performs a throttle close operation to close the throttle valve to, for example, decelerate a vehicle speed, the throttle valve position changing device operates to inhibit the throttle valve from being closed to the open position or less. Thus, a braking force of the engine brake that is smaller than that obtained without the control is obtained. As a result, it is possible to generate engine braking that is less likely to cause the rear wheel to slip.

The throttle valve position changing device may be an idle stopper operation device configured to change a position of an idle stopper of the throttle valve of the throttle device.

The throttle valve may be opened to an open position that is open to a predetermined degree from the idling position; for example, the open position may be open 3% to 10% from the idling position.

The throttle device may be configured to be operated by a fly-by-wire system. The throttle valve position changing device may be a throttle valve operation actuator configured to cause the throttle valve of the throttle device to open and close.

According to another aspect of the present invention, there is provided a leisure vehicle equipped with an internal combustion engine as a power unit to drive the leisure vehicle, comprising a throttle device mounted to the internal combustion engine; a throttle valve that is mounted in the throttle device and is configured to vary a cross-sectional area of an air-intake passage of the throttle device; and a dash pot that is disposed between a fixed member of the throttle device and the throttle valve, the dash pot being configured to be pressed to be contracted by the throttle valve while applying a pressing force against a closing operation of the throttle valve in a predetermined range from an idling position of the throttle valve (greatest-degree closed position) corresponding to an idling engine speed of the engine.

In accordance with the leisure vehicle constructed above, when the rider performs the operation to close the throttle in order to decelerate a vehicle speed, the dash pot applies the pressing force to the throttle valve being closed according to the close operation when the throttle valve moves into the predetermined range, to thereafter cause the throttle valve to be closed at a lower speed. Thus, a braking force of the engine brake that is smaller than that obtained without the control is obtained in a low engine speed range. As a result, it is possible to generate engine braking that is less likely to cause the rear wheel to slip.

The predetermined range may be within a range of approximately 3% to 10% open from the greatest-degree closed position.

The above and further objects and features of the invention will more fully be apparent from the following detailed description with accompanying drawings.

DETAILED DESCRIPTION OF THE PREFERRED EMBODIMENTS

Hereinafter, embodiments of a leisure vehicle of the present invention will be described with reference to the drawings. In the embodiments below, a motorcycle will be described.

Embodiment 1

Figure 1:
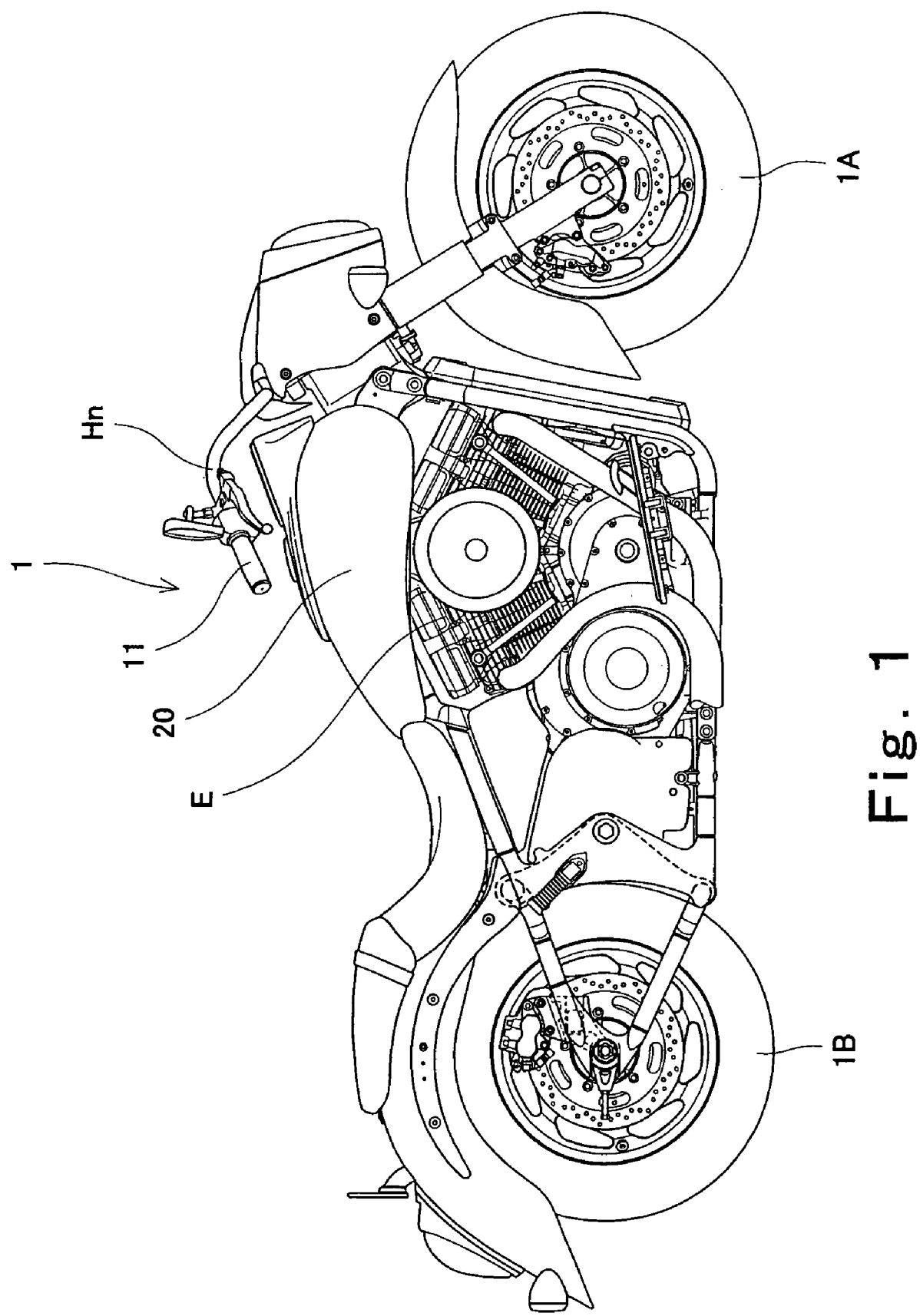
FIG. 1 is a side view of an entire motorcycle according to embodiments of the present invention.

Turning to FIG. 1, a front wheel 1A of a motorcycle 1 is a non-drive (free) wheel. A front wheel speed sensor unit 2A (see FIG. 2) is attached to the front wheel 1A and is configured to detect a rotational speed of the front wheel 1A. As a power unit to drive the motorcycle 1, a four-cycle internal combustion engine E is disposed below a fuel tank 20. A rear wheel 1B of the motorcycle 1 is a drive wheel configured to be driven by the four-cycle engine E. A rear wheel speed sensor unit 2B (see FIG. 2) is attached to the rear wheel 1B and is configured to detect a rotational speed of the rear wheel 1B.

Figure 2:
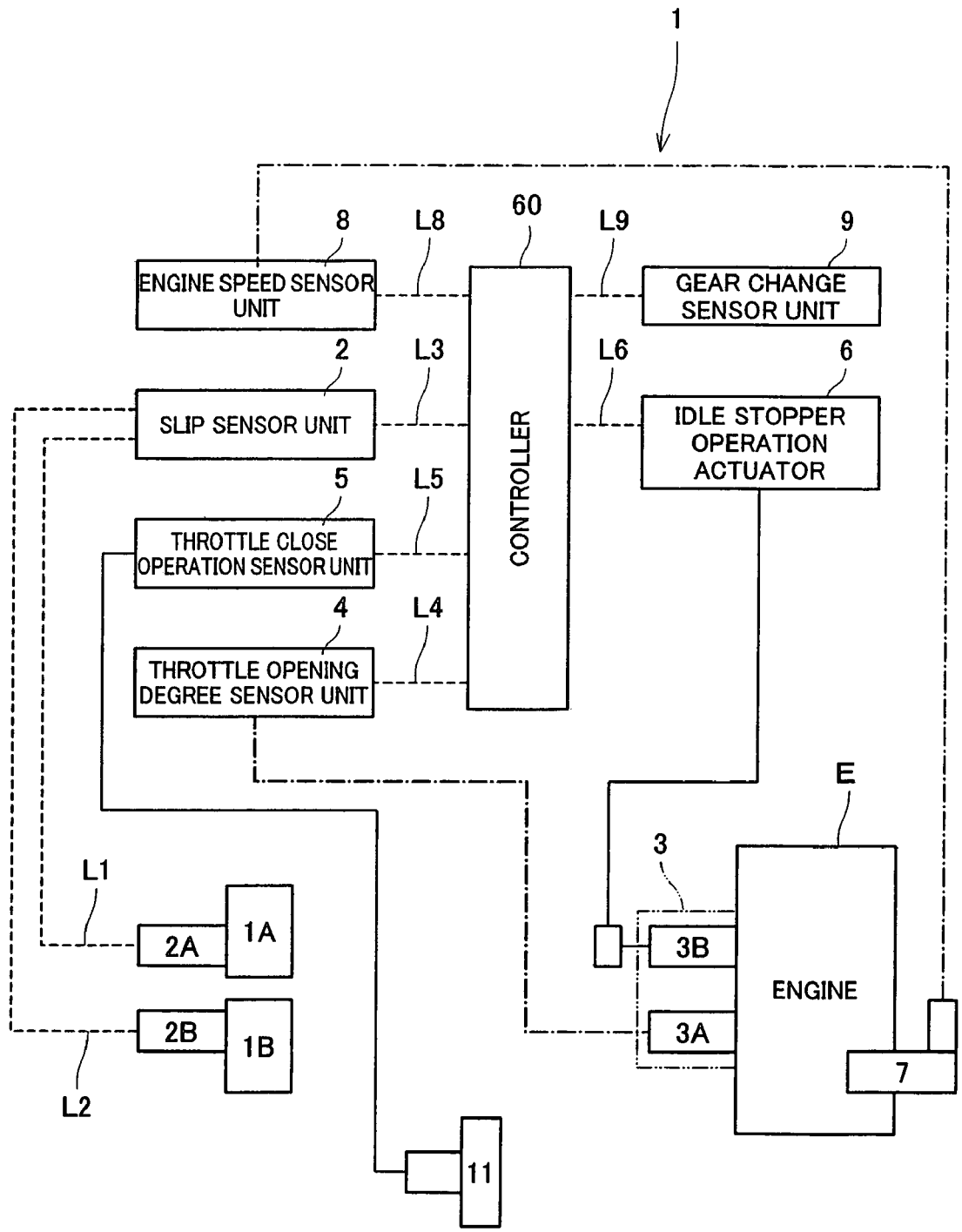
FIG. 2 is a block diagram showing configuration of components according to the embodiments of the present invention which are equipped in the motorcycle of FIG. 1.

As shown in FIG. 2, the front wheel speed sensor unit 2A and the rear wheel speed sensor unit 2B are coupled to a slip sensor unit 2 in a control unit through signals lines L1 and L2, respectively. The slip sensor unit 2 is configured to detect a slip state of the rear wheel 1B based on a ratio of the rotational speed of the front wheel 1A to the rotational speed of the rear wheel 1B. The slip sensor unit 2 is coupled to a controller 60 through a signal line L3 and is configured to communicate a signal indicating the slip state to the controller 60.

As shown in FIG. 2, a throttle device 3 is mounted in an air-intake system of the engine E. The throttle device 3 is configured to vary an amount of air or an air-fuel mixture supplied to the engine E to thereby control an engine speed. The throttle device 3 is provided with a throttle valve 3A configured to control an air-intake amount, i.e., amount of the air-fuel mixture. A throttle valve opening degree sensor unit 4 is attached to a pivot shaft or a throttle operation cable of the throttle valve 3A and is configured to detect an opening degree of the throttle valve 3A. The throttle valve opening degree sensor unit 4 is coupled to the controller 60 through a signal line L4.

A throttle grip 11, which is a throttle operation device, is attached to a right grip of a handle Hn of the motorcycle 1 illustrated in FIG. 1. The rider rotates the throttle grip 11 within a predetermined angle range, causing the throttle valve 3A of the throttle device 3 to open and close. A throttle close operation sensor unit 5 is attached to the throttle grip 11 and is configured to detect that the rider has performed an operation to close the throttle valve 3. The throttle close operation sensor unit 5 is coupled to the controller 60 through a signal line L5. Alternatively, the throttle close operation sensor unit 5 may be attached to a region of the engine E near the throttle device 3 rather than the throttle grip 11, or a wire (not shown) extending from the throttle grip 11 to the throttle device 3.

An idle stopper 3B is attached to the throttle device 3 and is configured to control an idling opening degree of the throttle valve 3A, which corresponds to an idling engine speed of the engine E. An idle stopper operation actuator 6, which is an idle stopper operation device, is able to control a position of the idle stopper 3B (closed position of the throttle valve 3) within a predetermined range. The idle stopper operation actuator 6 changes the position of the idle stopper 3B to change the opening degree of the throttle valve 3A of the throttle device 3. Thus, the idling engine speed of the engine E can be changed freely.

The idle stopper operation actuator 6 is coupled to the controller 60 through a signal line L6, and is able to operate under control of the controller 60 to thereby control the position of the idle stopper 3B, i.e., the engine speed of the engine E.

An engine speed sensor unit 8 is attached to a crankshaft 7 of the engine E and is configured to detect an engine speed. The engine speed sensor unit 8 is coupled to the controller 60 through a signal line L8 and is configured to communicate a signal indicating the engine speed of the engine E to the controller 60.

The motorcycle 1 constructed above operates as described below when the rider operates the engine brake. Below, the operation of the motorcycle 1 and the associated control process performed by the controller 60 will be described with reference to the flowchart of FIG. 3.

Figure 3:
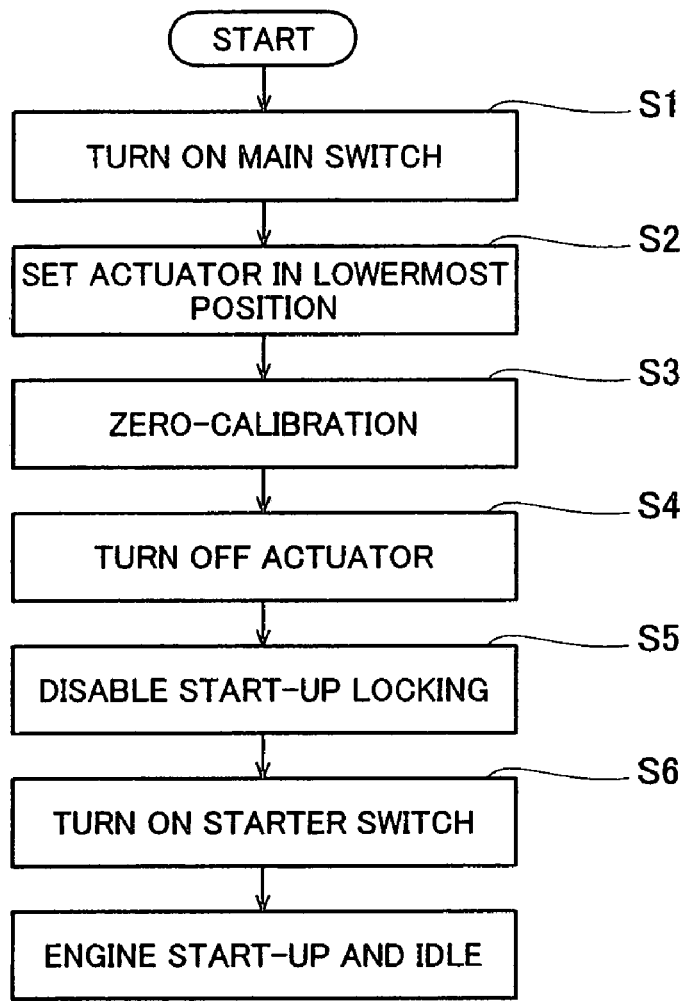
FIG. 3 is a flowchart showing a control process in the motorcycle equipped with the components of FIG. 2.

In the motorcycle 1 of the first embodiment, the controller 60 performs zero-calibration at the start-up. In an initial state, the motorcycle 1 is in a "start-up locking" state. As shown in FIG. 3, when the rider turns on a main switch (step S1), a movable member of the idle stopper operation actuator 6 is placed in a lowermost position, including a non-rotating position when the movable member is rotatable (step S2). With the idle stopper operation actuator 6 placed in the lowermost position, the controller 60 performs zero-calibration in such a manner that a zero value for a signal from the throttle opening degree sensor unit 4 that has detected the opening degree of the throttle valve 3A is redefined and a position of the throttle valve 3A is set to zero (step S3). Then, the controller 60 causes the idle stopper operation actuator 6 to be turned off (step S4). Then, the controller 6 causes the start-up locking to be disabled (step S5). Under this condition, upon operating a starter switch of the engine E, the engine E starts up (step S6). At this time, the movable member of the idle stopper operation actuator 6 is in the lowermost position, and the engine E is in an idling state. In the idling state, the engine E rotates at, for example, approximately 700 rpm to 800 rpm.

After the engine E is started up, the rider changes a gear position as necessary and operates the throttle grip 11 to increase the engine speed. Thereby, the motorcycle 1 starts to travel.

Figure 4:
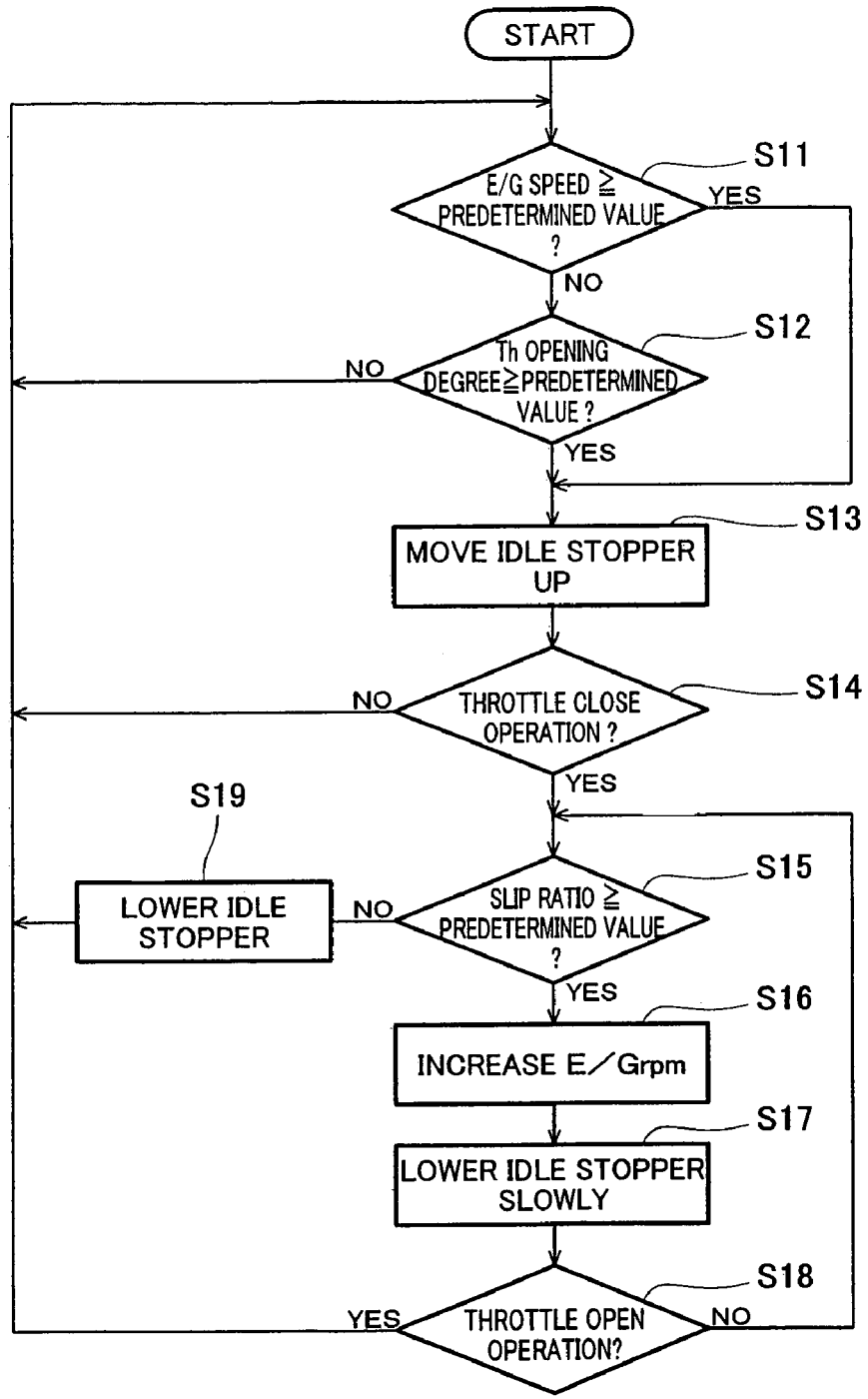
FIG. 4 is a flowchart showing a control process in the motorcycle equipped with the components of FIG. 2.

During travel of the motorcycle 1, the controller 60 carries out a series of control steps illustrated in the flowchart shown in FIG. 4.

When the motorcycle 1 is traveling, the controller 60 (see FIG. 2) determines whether or not a current engine speed is not less than a predetermined engine speed, for example, 2500 rpm (step S11). If it is determined that the engine speed is less than the predetermined engine speed, the controller 60 advances the process to step S12, whereas if it is determined that the engine speed is not less than the predetermined engine speed, the controller 60 advances the process to step S13.

In step S12, the controller 60 determines whether or not a current opening degree (Th opening degree) of the throttle valve 3A is not less than a predetermined value. To be specific, the controller 60 determines whether or not the opening degree of the throttle valve 3A is not less than a predetermined degree, for example, 10 degrees or 15 degrees when the throttle valve 3A is rotatable, or 1 mm distant from the lowermost position when the throttle valve 3A is slidable. If it is determined that the opening degree of the throttle valve 3A is not less than the predetermined value, the controller 60 advances the process to step S13, whereas if it is determined that the opening is less than the predetermined degree, the controller 60 returns the process to step S11.

In step S13, the controller 60 causes the idle stopper operation actuator 6 to operate to change the position of the idle stopper 3B to open the throttle valve 3A. In this case, the controller 60 may cause the idle stopper operation actuator 6 to operate to move up the idle stopper 3B to a predetermined position in such a manner that the predetermined position of the idle stopper 3B is decided based on a control map stored in the controller (or calculated values) in accordance with the engine speed obtained from the engine speed sensor unit 8 and/or the opening degree of the throttle valve 3A obtained from the throttle opening degree sensor unit 4. In this case, the idle stopper 3B may be caused to move up to the position in which the throttle valve 3A is 3% to 10% open. The illustrated value and range of the throttle valve 3A is merely exemplary, and other suitable values and ranges may be used.

Under this condition, when the rider performs a throttle close operation to close the throttle valve 3A, the throttle close operation sensor unit 5 detects this operation (step S14). A signal indicating that the throttle close operation has been performed to close the throttle valve 3A is communicated to the controller 60.

Receiving the signal, the controller 60 calculates a slip ratio from the signal from the slip sensor unit 2, i.e., a slip ratio obtained from a ratio of the rotational speed of the front wheel 1A to the rotational speed of the rear wheel 1B, and then determines whether or not a value of the slip ratio is not less than a predetermined value (step S15). To be specific, the controller 60 determines whether or not a value obtained by dividing the rotational speed of the front wheel 1A by the rotational speed of the rear wheel 1B is not less than 1.15. The value "1.15" is merely exemplary, and the value of the slip ratio may be suitably set depending on the type of the leisure vehicle, for example, in a range of approximately 1.05 to 1.02.

If it is determined that the slip ratio is not less than the predetermined value, the controller 60 causes the idle stopper operation actuator 6 to operate to change the position of the idle stopper 3B by a predetermined amount to open the throttle valve 3A, thereby increasing the engine speed of the engine E (step S16). Because of the increase in the engine speed by a predetermined amount, a braking force that is smaller than that obtained without the control is applied softly. As a result, the value of the slip ratio is improved. The predetermined amount may be several hundredths of the engine speed at that point of time, for example 200 rpm, or otherwise may be calculated based on a control map according to situations.

After the engine speed has been increased by the predetermined amount, the controller 60 causes the idle stopper operation actuator 6 to operate slowly to lower the idle stopper 3B at a speed lower than a speed obtained without the control of the controller 60 (step S17). Thereby, the idle stopper 3B causes the throttle valve 3A to close at a lower speed. To be specific, the position of the idle stopper 3B is changed slowly to cause the throttle valve 3A to close slowly so that the braking force is applied softly.

In practice, it is desired that the idle stopper operation actuator 6 operate to move the throttle valve 3A at a lower speed, based on the control map pre-stored in the controller 60. This lower speed may be calculated using, as parameters, a vehicle speed, an engine speed, a gear position, a slip ratio, etc., at that point of time.

When the idle stopper operation actuator 6 operates to move the throttle valve 3A at a lower speed based on the control map, in this embodiment, the control map is determined by a vehicle speed, an engine speed, a gear position, a slip ratio, etc., at that point of time. In other words, the idle stopper operation actuator 6 is controlled to operate to move the throttle valve 3A more slowly as the vehicle speed and the engine speed increase, and as a gear position is lower. Furthermore, the idle stopper operation actuator 6 is controlled to operate to move the throttle valve 3A more slowly as the slip ratio increases.

Figure 6:
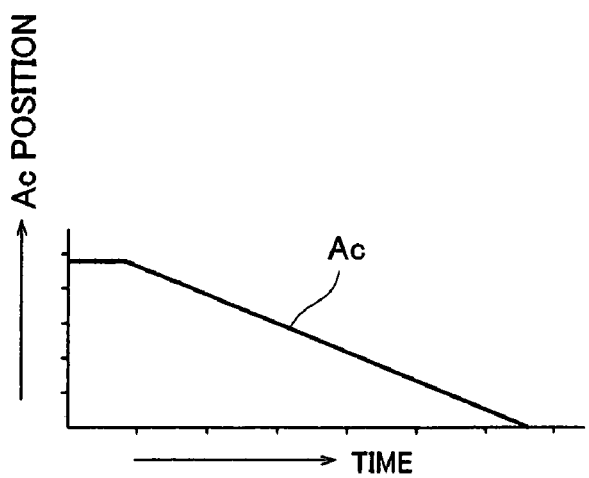
FIG. 6 is a graph showing a change in a position of an idle stopper that closes the throttle valve during deceleration illustrated in a right part of FIG. 5.

FIG. 6 is a graph showing a change in the position of the idle stopper 3B (Ac position) that is caused by the above mentioned operation of the idle stopper operation actuator 6. In FIG. 6, a vertical axis indicates the position of the idle stopper 3B (Ac position) and a horizontal axis indicates a time. As shown in a right part of FIG. 6, the position of the idle stopper 3B is indicated by a line Ac inclined downward during deceleration. At a time point where the line Ac indicating the change in the position of the idle stopper 3B crosses the horizontal axis, the throttle valve 3A is closed and the engine E is in an idle state. It shall be understood that an inclination angle of the line Ac indicates a rate at which the engine speed decreases.

Following the step S17, the controller 60 determines whether or not the rider has performed a throttle open operation to open the throttle valve 3A (step S18). If it is determined that the rider has not performed the operation, the controller 60 returns the process to step S15 and repeats the steps S15 to S17.

The controller 60 controls the idle stopper operation actuator 6 according to the slip ratio that varies with time. As a result, the slip of the rear wheel 1B is controlled to be within the predetermined amount.

If it is determined that the slip ratio is less than the predetermined value in step S15, the controller 60 causes the idle stopper 3B to lower to the position in step S13 (step S19), and returns the process to step S11. In this case, the throttle valve 3A is closed by the operation of the rider.

If it is determined that the throttle open operation to open the throttle valve 3A has been performed in step S18, the controller 60 returns the process to step S11. Thus, the control associated with the engine brake is disabled.

Under the above mentioned control process carried out by the controller 60, the slip of the rear wheel 1B of the motorcycle 1 is controlled to be within the predetermined amount. As a result, the motorcycle 1 is able to travel efficiently with a suitable grip force produced between the rear wheel 1B, which is the drive wheel, and the ground.

Figure 5:
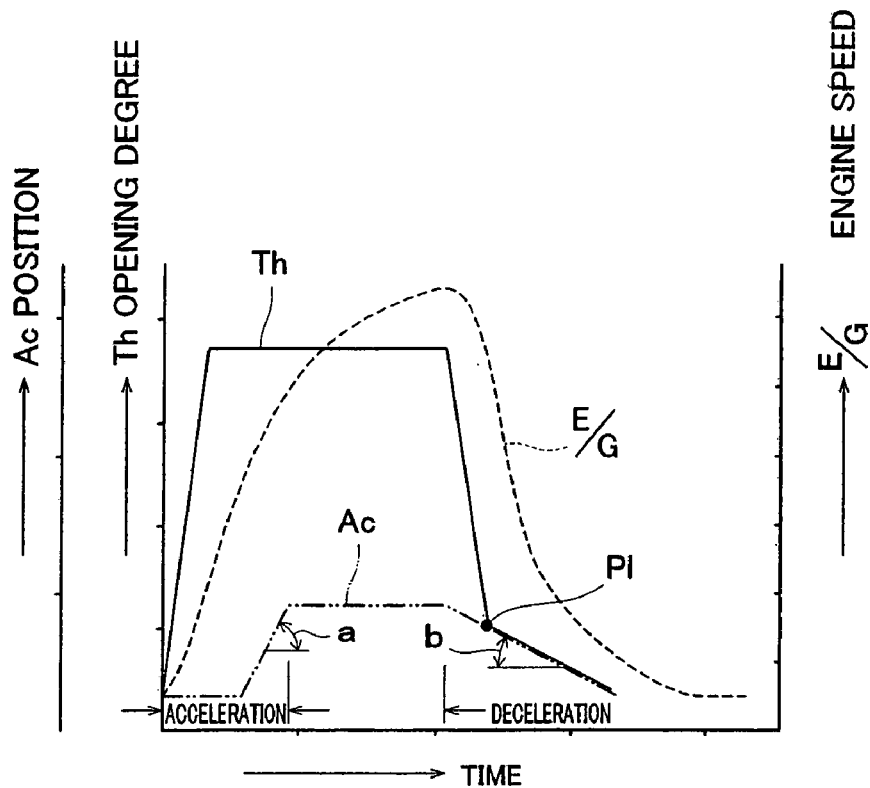
FIG. 5 is a graph showing the control process in the motorcycle equipped with the components of FIG. 2 and indicating changes in an idle stopper position, a throttle valve opening degree, and an engine speed.

FIG. 5 illustrates the above mentioned control process. In FIG. 5, an ordinate axis indicates the opening degree (Th opening degree) of the throttle valve 3A, the position of the idle stopper 3B (Ac position), and the engine speed (E/G engine speed) (rpm), and an abscissa axis indicates a time. In FIG. 5, a solid line indicates a change in the opening degree of the throttle valve 3A during acceleration (left part in FIG. 5), during traveling at a constant speed (center part in FIG. 5) and during deceleration (right part in FIG. 5), a two-dotted line indicates a change in the position (Ac position) of the idle stopper 3B, and a broken line indicates a change in the engine speed. In the right part of FIG. 5, an angle b formed by the solid line and the two-dotted line indicates a change in the position in the idle stopper 3B moving down during deceleration under the control of the controller 60. The control of the idle stopper 3B starts when the throttle valve 3A contacts the idle stopper 3B (see P1 in FIG. 5). After the point P1, the throttle valve 3A is closed at a speed slower than before. In the right part of FIG. 5, a curve indicated by a broken line indicates a gradual change in the engine speed which results from the control of the position of the idle stopper 3B. As can be seen from FIG. 5, the engine speed decreases with a delay with respect to the change in the throttle valve 3A being closed.

Figure 7:
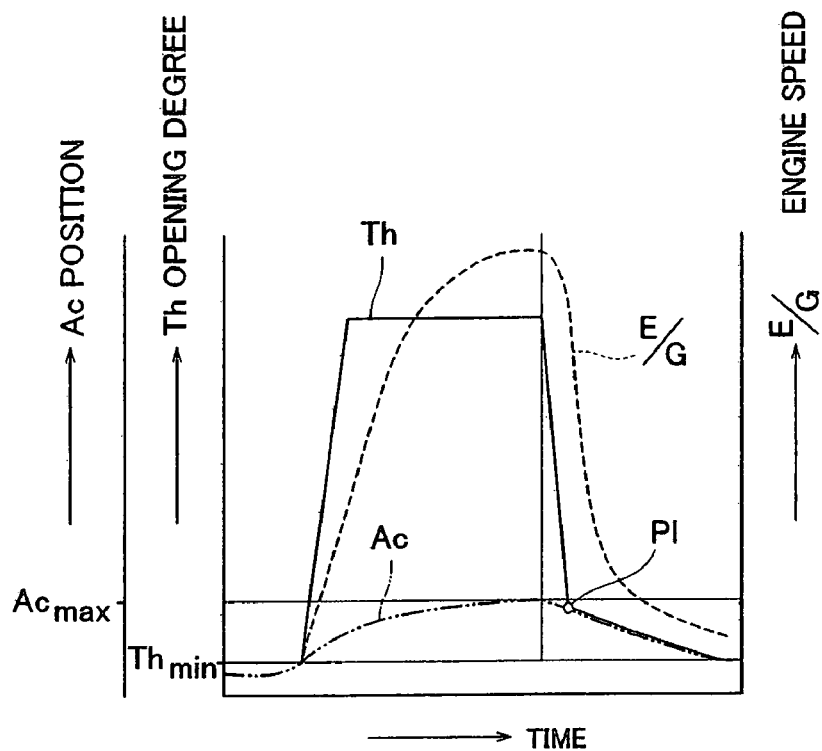
FIG. 7 is a graph showing the control process in the motorcycle equipped with alternative components and indicating changes in the position of the idle stopper, the opening degree of the throttle valve, and the engine speed.

In the left part of FIG. 5, an angle a indicates a change in the position of the idle stopper 3B moving up. As can be seen from this, the position of the idle stopper 3B changes, for example, moves up to open the throttle valve 3A, in proportion to the engine speed of the engine E, i.e., the opening degree of the throttle valve 3A, with a delay with respect to the change of the throttle valve 3A. The position of the idle stopper 3B may change in proportion to the opening degree of the throttle valve 3A in a straight line shape as shown in FIG. 5, or otherwise may increase or decrease in a curved line shape as shown in FIG. 7. In FIG. 7, Acmax indicates an upper limit position of the position (Ac position) of the idle stopper position 3B, and Thmin indicates a lower limit position of the throttle valve 3A. In FIG. 7, P1 indicates the position at which the throttle valve 3A starts to contact the idle stopper 3B. The engine E is in an idle state in which the engine speed is, for example, 700 rpm when the idle stopper 3B (Ac position) is in the lowermost position.

The rate at which the idle stopper 3B is lowered (inclination angle b in FIG. 5) is desirably inversely proportional to a vehicle speed at that point of time and to an engine speed at that point of time, and may be proportional to a gear position at that point of time.

In the above control process, the step S17 or the step S16 may be omitted for the sake of simplicity.

Figure 9:
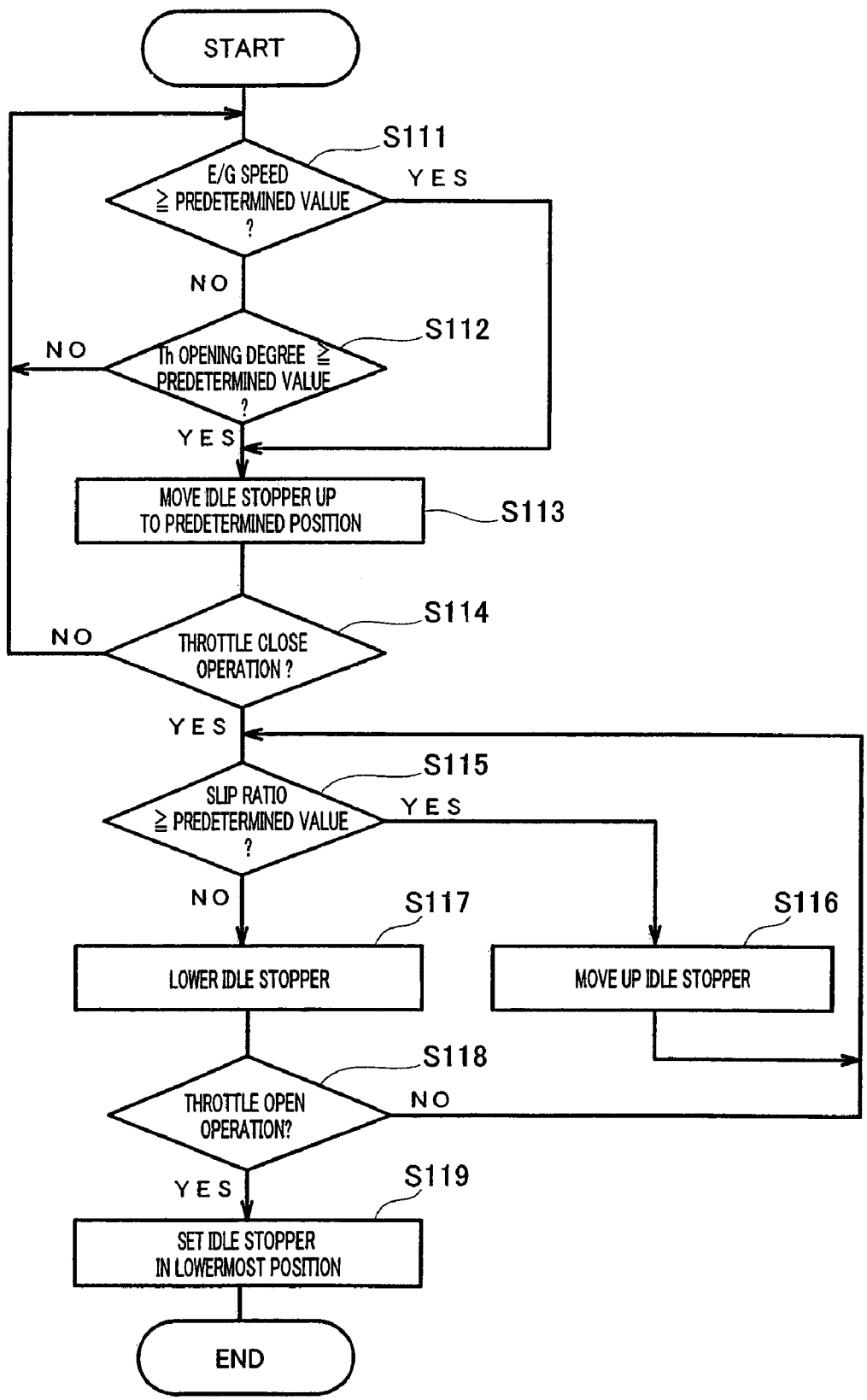
FIG. 9 is a flowchart showing a control process in the motorcycle equipped with alternative components.

In the above control process, the step S15 and the following steps may be configured as indicated by a flowchart of FIG. 9. In the flowchart of FIG. 9, since steps S111 to S115 are identical to the steps S111 to S15 in the control process of FIG. 4, they will not be further described in full. Rather, only the step S115 and the following steps will be described.

The controller 60 calculates a slip ratio at that point of time from the signal from the slip sensor unit 2, i.e., from a ratio of the rotational speed of the front wheel 1A to the rotational speed of the rear wheel 1B, and then determines whether or not a value of the slip ratio is not less than a predetermined value (step S115).

If it is determined that the slip ratio is not less than the predetermined value, the controller 60 causes the idle stopper operation actuator 6 to operate to change the position of the idle stopper 3B by a predetermined amount to open the throttle valve 3A, thereby increasing the engine speed of the engine E (step S116). Because of the increase in the engine speed, a braking force of the engine brake that is smaller than that obtained without the control is generated. As a result, the value of the slip ratio is improved.

Then, the controller 60 returns the process to step S115, and calculates the slip ratio at that point of time again, and determines whether or not the value is not less than the predetermined value (step S115).

If it is determined that the slip ratio is less than the predetermined ratio in step S115, the controller 60 causes the idle stopper operation actuator 6 to operate to change the position of the idle stopper 3B to close the throttle valve 3A, thus decreasing the engine speed (step S117). Since the slip ratio is less than the predetermined value, the engine speed is decreased according to the closing operation of the throttle valve 3A without the control. In this case, however, the rear wheel 1B does not slip by the predetermined amount or more.

In step S118, the controller 60 determines whether or not the rider has performed the throttle open operation to open the throttle valve 3A.

If it is determined that the rider has not performed the throttle open operation in step S118, the controller 60 returns the process to step S115 and repeats the steps S115 to S117 or the steps S115, S116, and S115.

If it is determined that the rider has performed the throttle open operation, the controller 60 causes the idle stopper operation actuator 6 to operate to set the idle stopper 3B in the lowermost position (step S119). Thus, the control process is terminated and returns to start in FIG. 9.

In the control process performed according to the flowchart of FIG. 9, the functions and effects of the present invention are achieved, as in the control process performed along the flowchart of FIG. 4.

Embodiment 2

Figure 8:
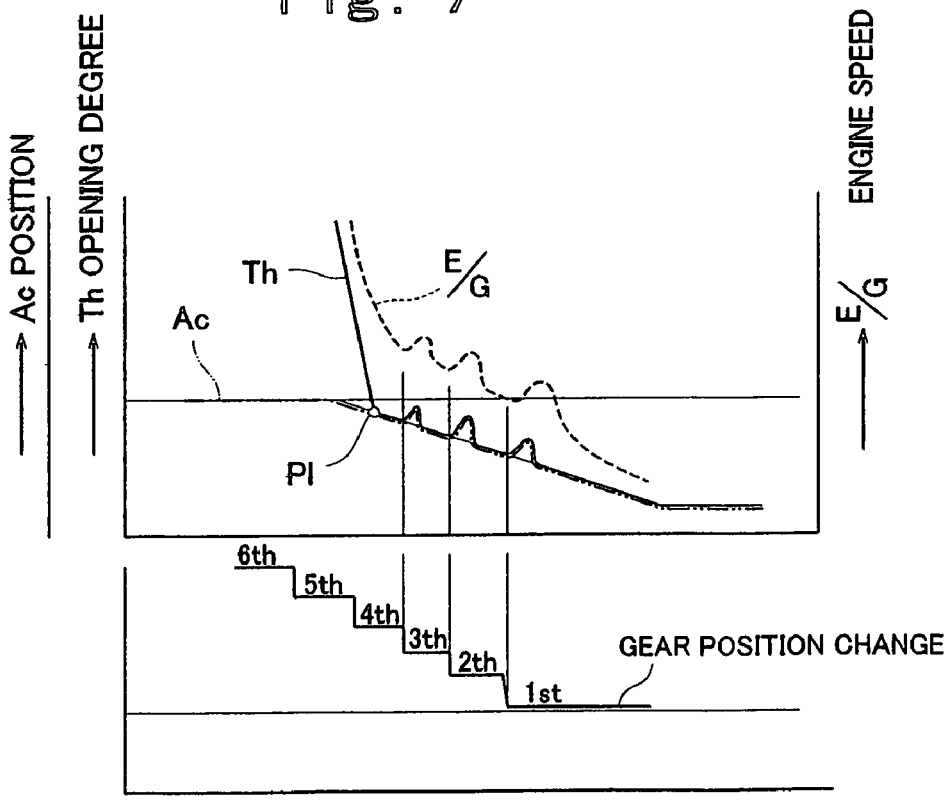
FIG. 8 is a graph showing the control process in the motorcycle equipped with alternative components and indicating changes in the position of the idle stopper, the opening degree of the throttle valve, and the engine speed.

Instead of or in addition to the configuration of Embodiment 1, a gear change sensor unit 9 (FIG. 2) is attached in an interior of a transmission (not shown) and is configured to detect a gear position change of the transmission. The gear change sensor unit 9 is communicatively coupled to the controller 60 through a signal line L9. As shown in FIG. 8, the controller 60 is configured to cause the idle stopper operation actuator 6 to operate for a moment, for example, move up by a predetermined amount (corresponding to approximately 800 rpm in terms of the engine speed) to change the position of the idle stopper 3B to open the throttle valve 3B, thus increasing the engine speed, each time the gear position is shifted down. This enables the downshift to smoothly take place. At an upper part of FIG. 8, a vertical axis indicates an opening degree (Th opening degree) of the throttle valve 3A, a position (Ac position) of the idle stopper 3B, and the engine speed (E/G engine speed), and a horizontal axis indicates time. In FIG. 8, a two-dotted line indicates a change in the position (see Ac in FIG. 8) of the idle stopper 3B, a solid line indicates an opening degree (see FIG. 8) of the throttle valve 3A, and a broken line indicates an engine speed (see E/G in FIG. 8). At a lower part of FIG. 8, a vertical axis indicates a gear position change and a horizontal axis indicates time. The engine speed is illustrated as being controlled to increase for a moment each time the shift down of the gear position is performed.

Embodiment 3

Figure 10A:
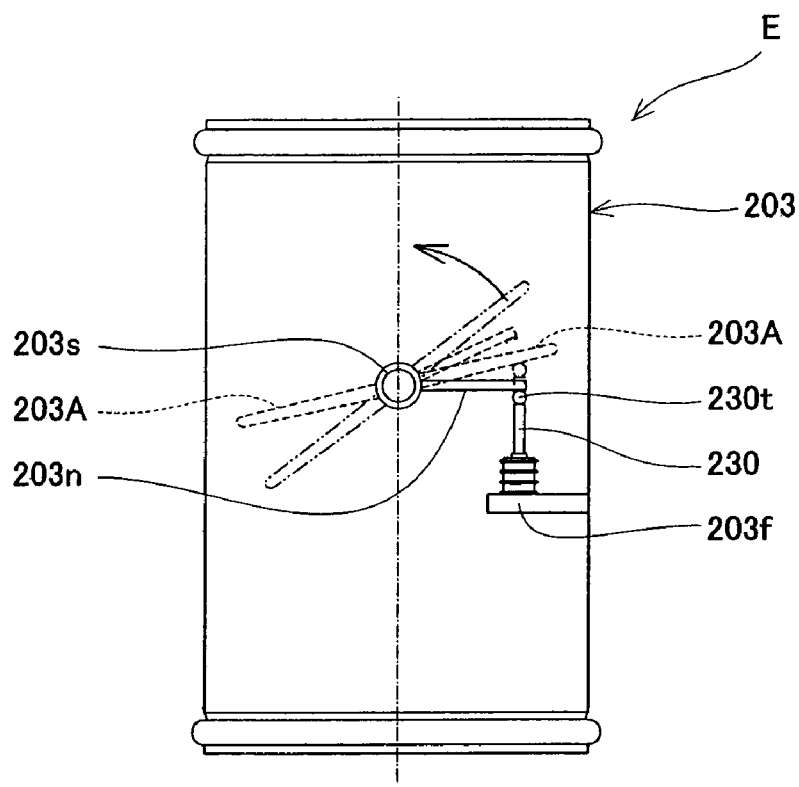
FIG. 10A is a side view showing components of a throttle device equipped in the motorcycle of FIG. 1.
Figure 10B:
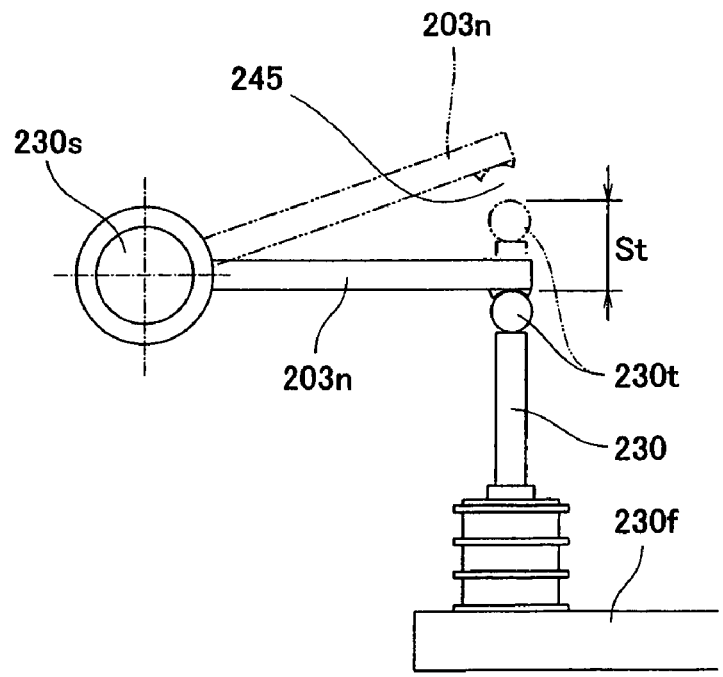
FIG. 10B is an enlarged side view showing the components of the throttle device of FIG. 10A.

As shown in FIGS. 10A and 10B, in order to generate a smaller braking force of the engine brake, a dash pot 230 with a stroke length of St is disposed between a fixed part 203f of a throttle device 203 of the engine E and a pivot shaft 203s of a throttle valve 203A of the throttle device 203 or the throttle valve 203A, to be specific, between the fixed part 203f and an engagement portion 203n attached to the pivot shaft 203s of the throttle valve 203A. The dash pot 230 is configured to be contracted slowly because of an internal fluidic resistance and a spring force applied by a compressive spring (not shown) when the throttle valve 203A is moved to a greatest-degree closed position corresponding to an idling engine speed of the engine by a spring force of a return spring (not shown) mounted on the throttle valve 203A (or a force exerted by the throttle valve operation actuator (not shown)), and is configured to be expanded by the spring force of the compressive spring of the dash pot 203.

In the third embodiment, the dash pot 230 is configured to contact the engagement portion 203n of the throttle valve 203A within a predetermined range of approximately 6% open position from the greatest-degree closed position of the throttle valve 203A. This predetermined range is suitably set based on a desired engine brake characteristic, and may be approximately 3% to 10% open from the greatest-degree closed position. As indicated by solid lines in FIGS. 10A and 10B, the dash pot 230 is contracted to a greatest degree with the throttle valve 203A closed to its greatest degree.

Figure 11:
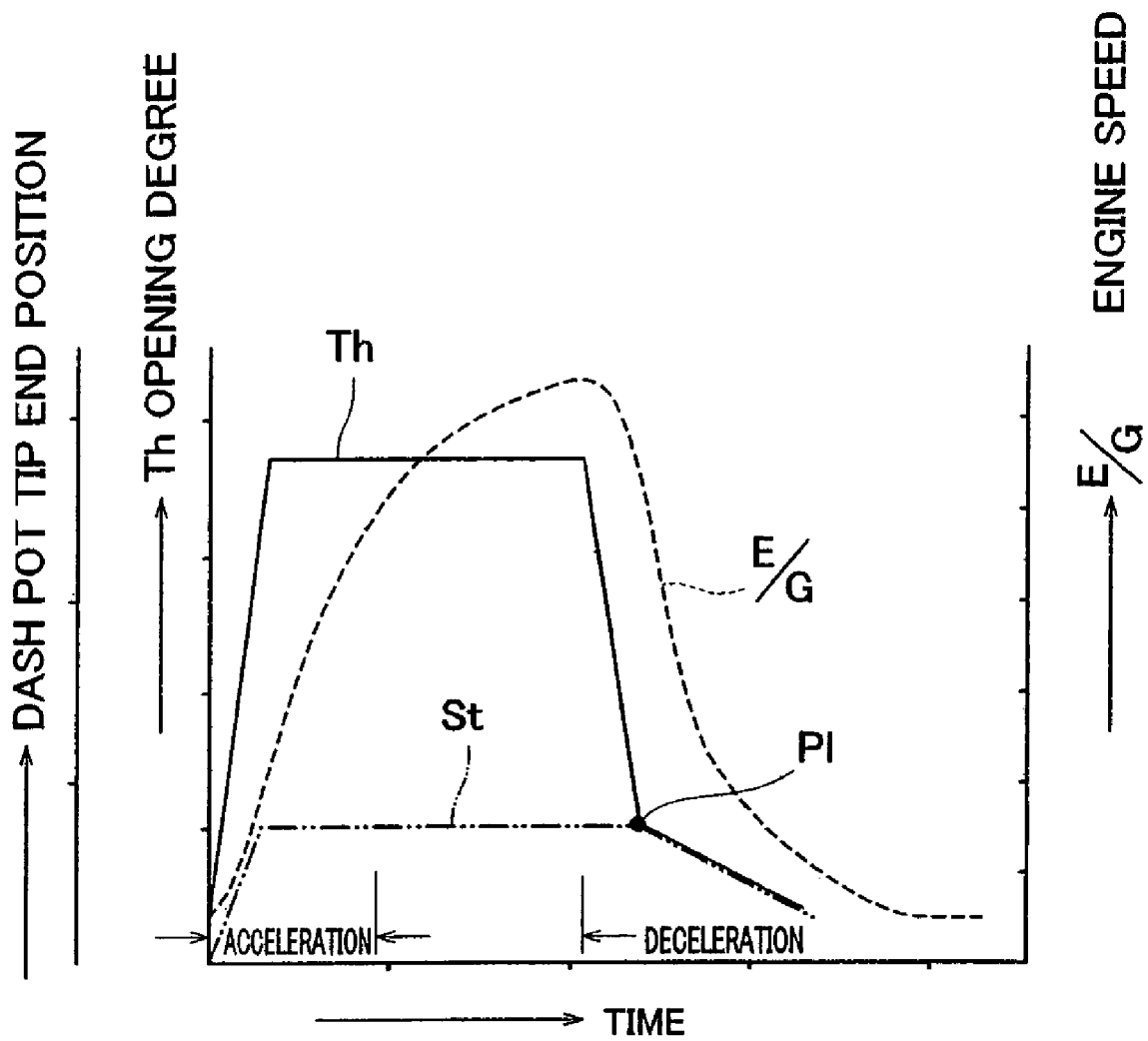
FIG. 11 is a graph of a control state according to the embodiment of FIG. 10A, showing changes in a position of a tip end of a dash pot, the opening degree of the throttle valve, and the engine speed.

In the motorcycle 1 of the third embodiment equipped with the throttle device 203 constructed above, the functions and effects of the first and second embodiments are achieved. To be specific, with the throttle valve 203A opened to a degree within the predetermined range or more (in the third embodiment, 6% or more), a gap 245 (see FIG. 10B) is formed between the dash pot 230 and the engagement portion 203n of the throttle valve 203A as indicated by two-dotted lines of FIGS. 10A and 10B. In this state, upon the rider performing a throttle close operation to close the throttle valve 203A, the throttle valve 203A moves to the closed to the 6% open position from the greatest-degree closed position such that the engagement portion 203n of the throttle valve 203A contacts a tip end 230t of the dash pot 230. After the contact between the throttle valve 203A and the dash pot 230, the throttle valve 203A is closed slowly because of the resistance of the dash pot 230. Therefore, a braking force that is smaller than that obtained without the control is obtained in a low engine speed range, in which the braking force of the engine is applied very effectively. For this reason, the slip of the drive wheel is effectively inhibited. FIG. 11 shows an opening degree Th of the throttle valve 203A, an engine speed E/G, and an expanded state St of the dash pot 230.

In FIG. 11, PI indicates a position at which the engagement portion 203n of the throttle valve 203A starts to contact the dash pot 230. In FIG. 11, a region extending under the position of PI is a region in which the dash pot 230 operates.

Embodiment 4

In the first to third embodiments, the idle stopper 3B or the dash pot 230 is mounted to the throttle device 3 to operate in the low engine speed range to decrease the engine speed slowly. When a throttle device equipped in the engine is operated by a fly-by-wire system, a suitable braking force of the engine is obtained by a configuration below without the idle stopper. The external components of the motorcycle are substantially identical to those of FIG. 1, and will not be further described.

Figure 12:
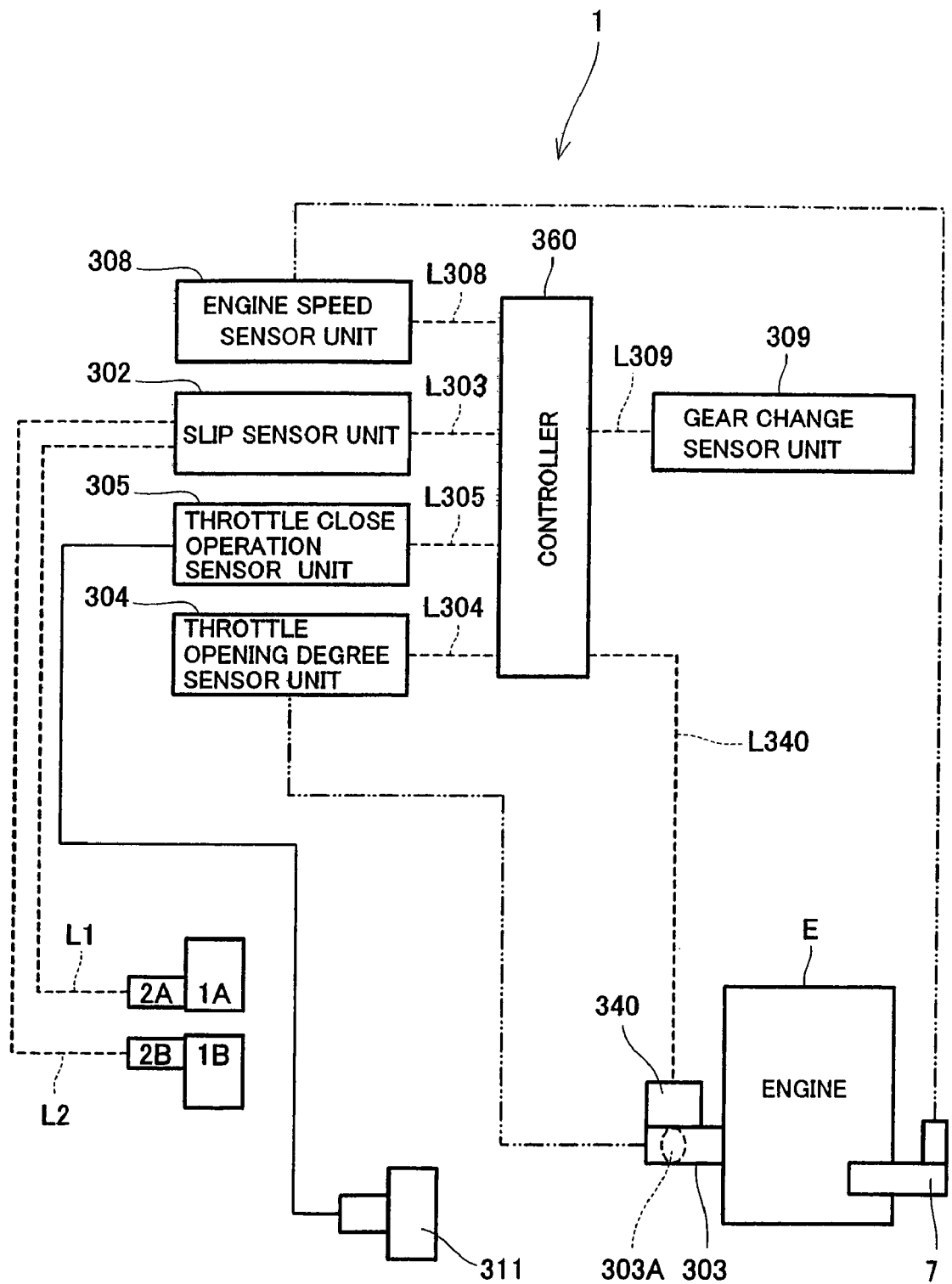
FIG. 12 is a block diagram showing alternative components equipped in the motorcycle of FIG. 1.

FIG. 12 is a block diagram showing the components of the motorcycle equipped with the throttle device operated by the fly-by-wire system. In FIG. 12, the same components as those of the first embodiment are identified by the same reference numbers, and the corresponding components are identified by reference numbers to which "300" is added.

In the fourth embodiment, the front wheel 1A of the motorcycle 1 is a non-drive wheel. The front wheel speed sensor unit 2A is attached to the front wheel 1A and is configured to detect the rotational speed of the front wheel 1A. The rear wheel 1B of the motorcycle 1 is a drive wheel configured to be driven by the four-cycle internal combustion engine E. The rear wheel speed sensor unit 2B is attached to the rear wheel 1B and is configured to detect the rotational speed of the rear wheel 1B.

As shown in FIG. 12, the front wheel speed sensor unit 2A and the rear wheel speed sensor unit 2B are coupled to a slip sensor unit 302 in a control unit through signals lines L1 and L2, respectively. The slip sensor unit 302 is configured to detect a slip state of the rear wheel 1B from a ratio of the rotational speed of the front wheel 1A to the rotational speed of the rear wheel 1B. The slip sensor unit 302 is communicatively coupled to a controller 360 through a signal line. L303 and is configured to communicate a signal indicating the slip state to the controller 360.

As shown in FIG. 12, a throttle device 303 is mounted in an air-intake system of the engine E. The throttle device 303 is configured to vary an amount of air taken into the engine E to thereby control an engine speed. The throttle device 303 is provided with a throttle valve 303A configured to control an air-intake amount. A throttle valve opening degree sensor unit 304 is attached to a pivot shaft of the throttle valve 303A and is configured to detect an opening degree of the throttle valve 303A. The throttle valve opening degree sensor unit 304 is communicatively coupled to the controller 360 through a signal line L304.

A throttle grip 311, which is a throttle operation device, is attached to a right grip of the handle Hn (see FIG. 1) of the motorcycle 1. The rider rotates the throttle grip 311 within a predetermined angle range to enable the fly-by-wire system to cause the throttle valve 303A of the throttle device 303 distant from the throttle grip 311 to open and close. In the fourth embodiment, a throttle close operation sensor unit 305 is attached to the throttle grip 311 and is configured to detect that the rider has performed a throttle close operation to close the throttle valve 303A. The throttle close operation sensor unit 305 is coupled to the controller 360 through a signal line L305.

A throttle valve operation actuator 340 is mounted to the throttle device 303 and is configured to cause the throttle valve 303A to open and close to a predetermined opening degree under control of the controller 360. In the fourth embodiment, the throttle valve operation actuator 340 includes a DC motor. The throttle valve operation actuator 340 may be a stepping motor or other motors, or otherwise a drive actuator such as a hydraulic actuator.

The throttle valve operation actuator 340 is communicatively coupled to the controller 360 through a signal line L340, and is configured to cause the throttle valve 303A to move by an amount according to an instruction from the controller 360. In other words, the throttle valve operation actuator 340 causes the opening degree of the throttle valve 303A to change under control of the controller 360 to freely change the engine speed of the engine E in all engine speed ranges.

In the fourth embodiment, the controller 360 is configured to change a minimum engine speed from the idling engine speed to an engine speed that is higher than the idling engine speed and corresponds to a compensated throttle valve opening degree that is a predetermined number of degrees larger than the idling opening degree, when the rider performs the throttle close operation to close the throttle valve 303A, after the throttle valve 303A is opened to a predetermined opening degree, or more.

An engine speed sensor unit 308 is attached to the crankshaft 7 of the engine E and is configured to detect the engine speed. The engine speed sensor unit 308 is coupled to the controller 360 through a signal line L308 and is configured to communicate a signal indicating the engine speed of the engine E to the controller 360.

The motorcycle 1 as constructed above operates as described below when the rider operates the engine brake. Below, the operation of motorcycle 1 and the associated control process performed by the controller 360 will be described with reference to the flowchart of FIG. 13.

Figure 13:
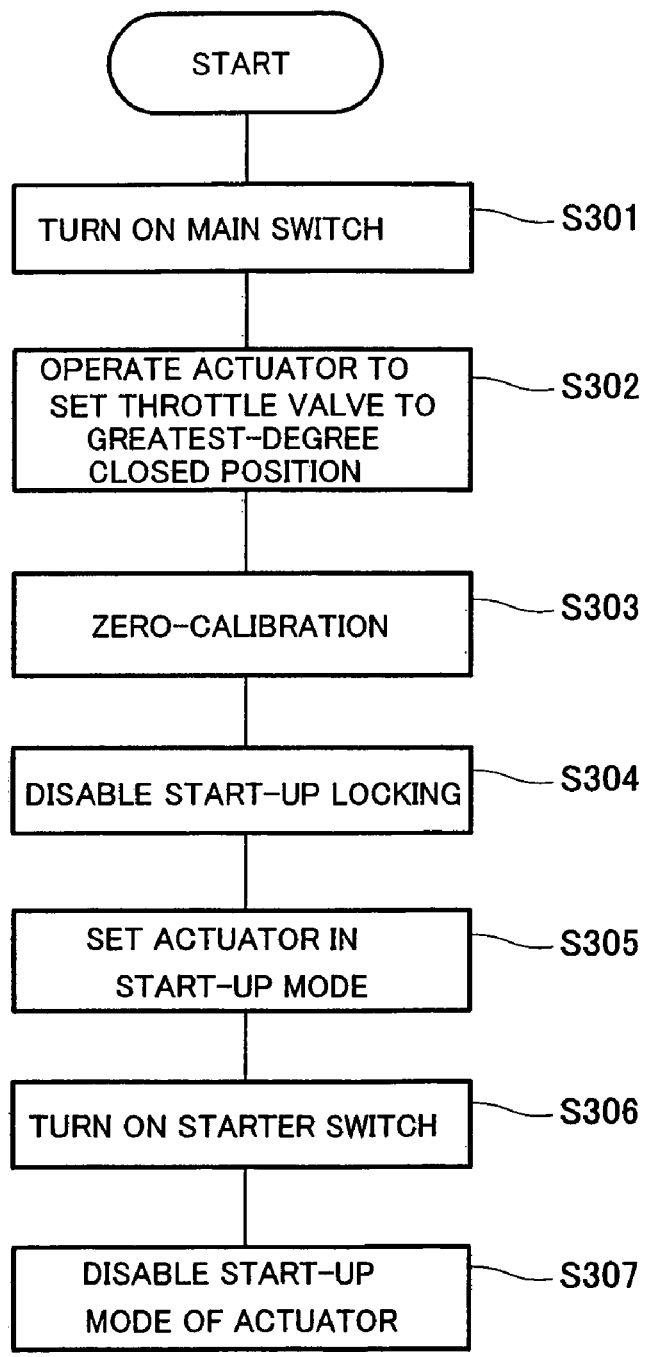
FIG. 13 is a flowchart showing a control process in the motorcycle having a configuration of FIG. 12.

In the motorcycle 1 of the fourth embodiment, the controller 360 performs zero-calibration at the start-up as in the first embodiment. In an initial state, the motorcycle 1 is in a "start-up locking" state. As shown in FIG. 13, when the rider turns on a main switch (step S301), a movable member (e.g., rotational shaft) of the throttle valve operation actuator 340 is placed in the position where the throttle valve 303A is in a greatest-degree closed position (step S302). The greatest-degree closed position of the throttle valve 303A is an idling position with an idling opening degree corresponding to the idling engine speed. The controller 360 performs zero-calibration in such a manner that a zero value for a signal from the throttle opening degree sensor unit 304 that has detected the opening degree of the throttle valve 303A is redefined and a position of the throttle valve 303A is set to zero (step S303). Then, the controller 360 causes the start-up locking to be disabled (step S304). In this state, the controller 360 enables the engine start-up mode. To be specific, the controller 360 causes the throttle valve operation actuator 340 to operate to open the throttle valve 303A to a position that is slightly larger than the idling opening degree, for example, about 5 to 10 degrees larger than the idling opening degree (step S305). Under this condition, upon the rider operating a starter switch (step S306), the engine E starts-up. At this time, the engine E turns to a warm-up operation state, and rotates at an engine speed slightly higher than the idling engine speed until the warm-up operation ends. During the warm-up operation, the engine E rotates at an engine speed higher than the idling engine speed, for example, approximately 1000 rpm to 2000 rpm. The engine speed during the warm-up operation typically varies depending on ambient temperature.

When the warm-up operation ends, the controller 360 disables the start-up mode of the throttle valve operation actuator 340 to return the throttle valve 303A to the idling opening degree (step S307). At this time, the idling engine speed is approximately 900 rpm. In this state, to start the motorcycle 1, the rider first changes a gear position, and operates the throttle grip 311 to open the throttle, thereby increasing the engine speed. Thus, the motorcycle 1 starts to travel.

Figure 14:
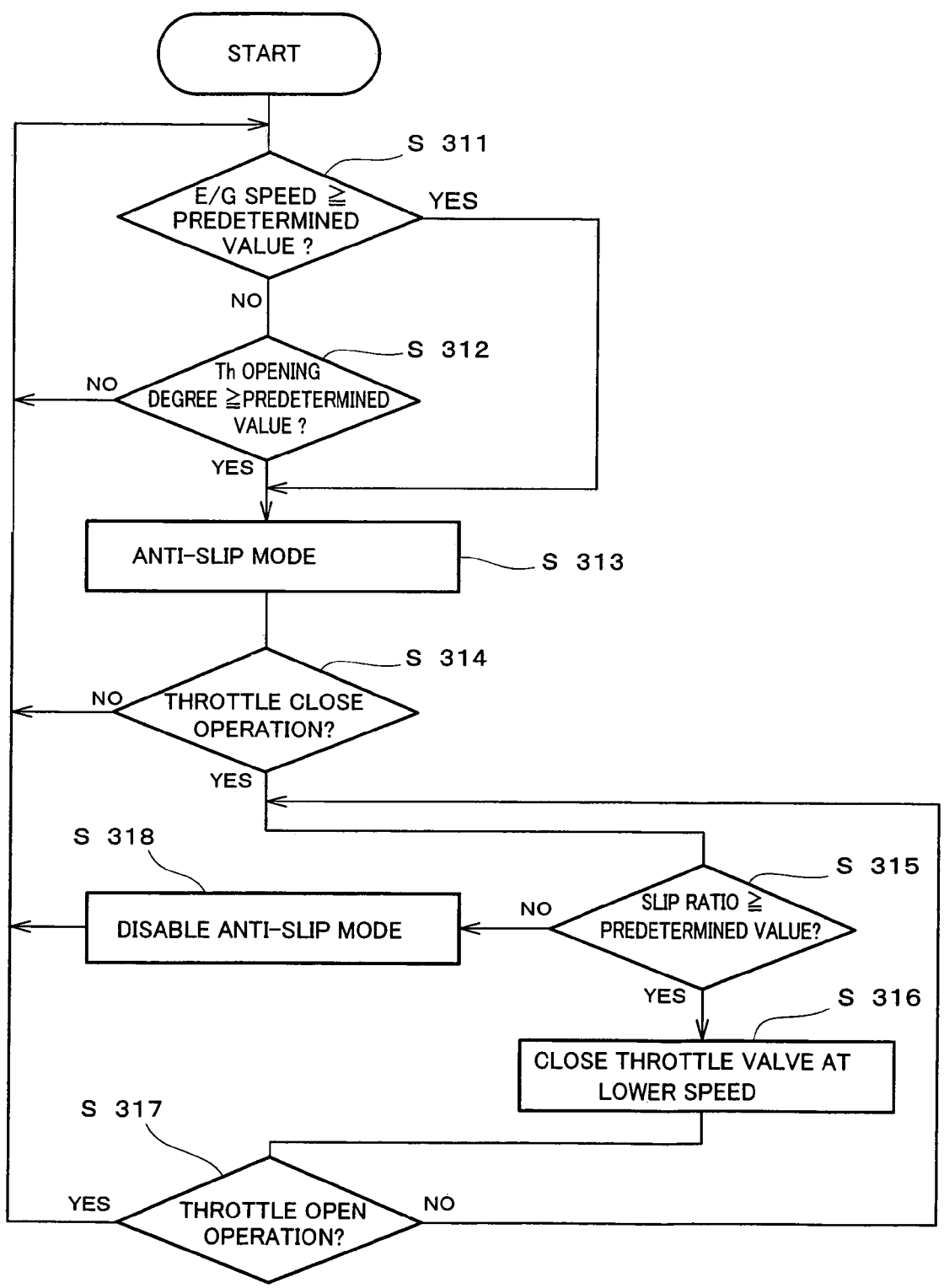
FIG. 14 is a flowchart showing a control process in the motorcycle having the configuration of FIG. 12.

When the rider operates the engine brake during the travel of the motorcycle 1, the controller 360 carries out a series of control steps illustrated in FIG. 14.

When the motorcycle 1 is traveling, the controller 360 (see FIG. 12) determines whether or not a current engine speed obtained from the engine speed sensor unit 308 is not less than a predetermined engine speed, for example, 2500 rpm (step S311). If it is determined that the engine speed is less than the predetermined engine speed, the controller 360 advances the process to step S312, whereas if it is determined that the engine speed is not less than the predetermined engine speed, the controller 360 advances the process to step S313.

In step S312, the controller 360 determines whether or not a current opening degree (Th opening degree) of the throttle valve 303A is not less than a predetermined value. To be specific, the controller 360 determines whether or not the opening degree obtained from the throttle opening degree sensor unit 304 is not less than a predetermined degree, for example, 10 degrees or 15 degrees from the greatest-degree closed position when the throttle valve 3A is rotatable, or a 1 mm or larger distance from the greatest-degree closed position when the throttle valve 303A is a slidable valve. If it is determined that the opening degree of the throttle valve 303A is not less than the predetermined value, the controller 360 advances the process to step S313, whereas if it is determined that the opening degree is less than the predetermined degree, the controller 360 returns the process to step S311.

In step S313, the controller 360 enables an anti-slip mode. In the anti-slip mode, the controller 360 changes a closed position of the throttle valve 303A from the idling position (greatest-degree closed position) corresponding to the idling engine speed to an opening position with the compensated opening degree corresponding to an engine speed higher than the idling engine speed. The compensated opening degree is 3% to 10%, preferably 5% to 6%, open from the idling opening degree. The compensated opening degree may be fixed values. Nonetheless, the compensated opening degree is desirably obtained based on a control map stored in the controller (or calculated values) in accordance with the detected value of the engine speed from the engine speed sensor unit 308 and/or the detected value of the opening degree of the throttle valve 303A from the throttle opening degree sensor unit 304. The illustrated values of the compensated idling opening degree, 3% to 10%, are merely exemplary, and the values may vary depending on a characteristic or use of the motorcycle 1. Furthermore, the idling engine speed or the engine speed during the warm-up operation are merely exemplary.

Under this condition, when the rider operates the throttle grip 11 to close the throttle valve 303A, the throttle close operation sensor unit 305 detects that the throttle close operation has been performed by the rider (step S314). A signal indicating that the throttle close operation to close the throttle valve 303A has been performed is communicated to the controller 360 through the control line L305.

Receiving the signal, the controller 360 calculates a slip ratio from the signal from the slip sensor unit 302, i.e., a slip ratio obtained from the ratio of the rotational speed of the front wheel 1A to the rotational speed of the rear wheel 1B, and then determines whether or not a value of the slip ratio is not less than a predetermined value as in the first embodiment (step S315), which will not be further described.

If it is determined that the slip ratio is not less than the predetermined value, the controller 360 causes the throttle valve operation actuator 340 to operate to close the throttle valve 303A at a lower speed (step S316). In this case, the throttle valve 303A closes at a speed lower than the speed obtained by the rider's operation of the throttle grip 11 to close the throttle. As a result, the value of the slip ratio is improved.

In the anti-slip mode, the greatest-degree closed position of the throttle valve 303A is the compensated throttle valve opening degree. With this configuration, a braking force that is smaller than that obtained without the control is applied. As a result, a non-slip state or a small slip ratio state is obtained.

In practice, it is desired that the throttle valve 303A move at a lower speed, based on the control map pre-stored in the controller 60. The lower speed may be calculated using, as parameters, a vehicle speed, an engine speed, a gear position, a slip ratio, etc., at that point of time.

When the throttle valve operation actuator 340 operates to move the throttle valve 303A at a lower speed based on the control map, in this embodiment, the control map is determined by a vehicle speed, an engine speed, a gear position, a slip ratio, etc., at that point of time. In other words, the throttle valve operation actuator 340 is controlled to operate to move the throttle valve 303A more slowly as the vehicle speed and the engine speed increase, and as a gear position is lower. Furthermore, the throttle valve operation actuator 340 is controlled to operate to move the throttle valve 303A more slowly as the slip ratio increases.

Following the step S316, the controller 360 determines whether or not the rider has performed a throttle open operation to open the throttle valve 303A (step S317). If it is determined that the rider has not performed the operation, the controller 360 returns the process to step S315 and repeats the steps S315 to S317.

The controller 360 controls the throttle valve operation actuator 340 according to the slip ratio that varies with time. As a result, the slip of the rear wheel 1B is controlled to be within the predetermined amount.

If it is determined that the slip ratio is less than the predetermined value in step S315, the controller 360 disables the anti-slip mode in step S318, and returns the process to step S3 11. In this case, the controller 360 disables the control associated with the engine brake, and the throttle valve 303A is moved in response to the operation of the rider.

If it is determined that the throttle open operation has been performed to open the throttle valve 303A in step S317, the controller 360 returns the process to step S311. Thus, the controller 360 disables the control associated with the engine brake, and the throttle valve 303A is moved in response to the operation of the rider.

Under the above mentioned control process carried out by the controller 360, the motorcycle 1 is able to travel efficiently with a suitable grip force produced between the rear wheel 1B which is the drive wheel and the ground.

In the description of the fourth embodiment above, the particular manner of controlling the engine braking in a range that is less than the opening degree conforming to the compensated throttle valve opening degree is not mentioned.

If the slip ratio is not less than the predetermined value when the engine brake is applied in the range between the compensated throttle valve opening degree and the throttle valve opening degree corresponding to the idling engine speed, the controller 360 may be configured to cause the throttle valve operation actuator 340 to operate to close the throttle valve 303A at a lower speed.

Whereas in the embodiments mentioned so far, the present invention is applied to a motorcycle, the present invention may be applied to leisure vehicles such as ATVs. Furthermore, the present invention may be applied to two-cycle internal combustion engines as well as to the four-cycle internal combustion engines.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A leisure vehicle equipped with an internal combustion engine as a power unit to drive the leisure vehicle, comprising:
    a drive wheel;
    a slip sensor unit configured to detect a slip of the drive wheel;
    a throttle device mounted to the internal combustion engine;
    a throttle valve position changing device configured to change a position of a throttle valve of the throttle device;
    a throttle close operation sensor unit configured to detect that a rider has performed a throttle close operation to close the throttle valve of the throttle device; and
    a controller configured to control an operation of the throttle valve position changing device;
    wherein the controller is configured to cause the throttle valve position changing device to operate to change the position of the throttle valve to increase an engine speed of the engine for a moment, when the throttle close operation sensor unit detects that the rider has performed the throttle close operation and the slip sensor unit detects the slip of the drive wheel.

2. The leisure vehicle according to claim 1, wherein the throttle valve position changing device is an idle stopper operation device configured to change a position of an idle stopper of the throttle valve of the throttle device.

3. The leisure vehicle according to claim 2, further comprising:
    a non-drive wheel;
    wherein the slip sensor unit is configured to detect a state of the slip based on a ratio between a rotational speed of the non-drive wheel and a rotational speed of the drive wheel.

4. The leisure vehicle according to claim 2, wherein the internal combustion engine is a four-cycle internal combustion engine.

5. The leisure vehicle according to claim 2, further comprising:
    an engine speed sensor unit configured to detect an engine speed of the engine;
    wherein the controller is configured to cause the idle stopper operation device to operate to change the position of the idle stopper to open the throttle valve to a predetermined state, when the engine speed sensor unit detects a predetermined engine speed which is larger than an idling engine speed.

6. The leisure vehicle according to claim 5, wherein the controller is configured to change the position of the idle stopper to open the throttle valve to the predetermined state, according to the engine speed of the internal combustion engine.

7. The leisure vehicle according to claim 2, further comprising:
    a throttle opening degree sensor unit configured to detect an opening degree of the throttle valve;
    wherein the controller is configured to cause the idle stopper operation device to operate to change the position of the idle stopper to open the throttle valve to a predetermined state, when the throttle opening degree sensor unit detects that the opening degree of the throttle valve is a predetermined degree which is larger than an idling position.

8. The leisure vehicle according to claim 7, wherein the controller is configured to change the position of the idle stopper to open the throttle valve to the predetermined state, according to the opening degree of the throttle valve.

9. The leisure vehicle according to claim 2, wherein the controller is configured to cause the idle stopper operation device to operate to change the position of the idle stopper to open the throttle valve, thereby increasing the engine speed, and thereafter, is configured to cause the idle stopper operation device to operate to change the position of the idle stopper to close the throttle valve at a speed slower than a speed obtained by the rider's operation to close the throttle valve, thereby obtaining an engine braking force that is smaller than an engine braking force obtained without control of the controller.

10. The leisure vehicle according to claim 2, further comprising:
    a gear change sensor unit configured to detect a gear position change of a transmission;
    wherein the controller is configured to, for a moment, cause the idle stopper operation device to operate to change the position of the idle stopper to open the throttle valve to a predetermined state, when the gear change sensor unit detects a downshift performed by the rider.

11. The leisure vehicle according to claim 1, wherein the throttle device is configured to be operated by a fly-by-wire system; and wherein the throttle valve position changing device is a throttle valve operation actuator configured to cause the throttle valve of the throttle device to open and close.

* * * * *